United States Patent
De Olivera Cardoso (10) Patent No.: US 11,638,337 B2
(45) Date of Patent: Apr. 25, 2023

(54) DIGITAL DIMMER AND METHOD FOR VARYING THE LUMINOUS INTENSITY OF AN ELECTRONIC LIGHT SOURCE

(71) Applicant: SMART HOME SA, Gland (CH)

(72) Inventor: Rui Manuel De Olivera Cardoso, Morges (CH)

(73) Assignee: SMART HOME SA, Gland (CH)

( * ) Notice: Subject to any disclaimer, the term of this patent is extended or adjusted under 35 U.S.C. 154(b) by 0 days.

(21) Appl. No.: 17/321,625

(22) Filed: May 17, 2021

(65) Prior Publication Data
US 2021/0360754 A1    Nov. 18, 2021

(30) Foreign Application Priority Data
May 18, 2020    (EP) ..................................... 20175235

(51) Int. Cl.
*H05B 45/10* (2020.01)
*H05B 45/325* (2020.01)

(52) U.S. Cl.
CPC ........... *H05B 45/10* (2020.01); *H05B 45/325* (2020.01)

(58) Field of Classification Search
CPC ...... H05B 45/10; H05B 45/325; H05B 45/32; H05B 39/044; H05B 45/37
USPC ................................................. 315/307, 291
See application file for complete search history.

(56) References Cited

U.S. PATENT DOCUMENTS

| | | | | |
|---|---|---|---|---|
| 2015/0194843 | A1* | 7/2015 | Singer | H05B 41/14 315/86 |
| 2015/0250034 | A1 | 9/2015 | Esaki et al. | |
| 2016/0366741 | A1* | 12/2016 | Yagi | H05B 45/375 |
| 2019/0320515 | A1* | 10/2019 | Sadwick | H05B 45/37 |

FOREIGN PATENT DOCUMENTS

| | | |
|---|---|---|
| WO | 2011/100803 A1 | 8/2011 |
| WO | WO-2011100803 A1 * | 8/2011 ......... H05B 37/0209 |

OTHER PUBLICATIONS

European Search Report for EP 20175235.9 dated Sep. 16, 2020.

* cited by examiner

*Primary Examiner* — Seokjin Kim
(74) *Attorney, Agent, or Firm* — Pearne & Gordon LLP (57) ABSTRACT

Digital dimmer for varying the luminous intensity of an electronic light source, including an operation interface module, arranged for receiving a user command, and a control and processing module, arranged for modulating each half cycle of alternating current on the basis of the user command. If the user command is to turn on the electronic light source at a dimming value lower than 25%, the control and processing module modulates the alternating current at a first dimming value equal or higher than 30% in a given number of half cycles of the alternating current, wherein the duration of the given number of half cycles is not perceptible by the user's eye. Then, the control and processing module modulates the alternating current at a second dimming value lower than 25% to ensure that the user sees only that the electronic light source lights up at the second dimming value.

20 Claims, 8 Drawing Sheets

STATE OF THE ART

Fig. 1

STATE OF THE ART

STATE OF THE ART

DIGITAL DIMMER AND METHOD FOR VARYING THE LUMINOUS INTENSITY OF AN ELECTRONIC LIGHT SOURCE

TECHNICAL FIELD

The present invention concerns a digital dimmer for varying the luminous intensity of an electronic light source. The present invention concerns also a method for varying the luminous intensity of an electronic light source.

BACKGROUND

Figure 1:
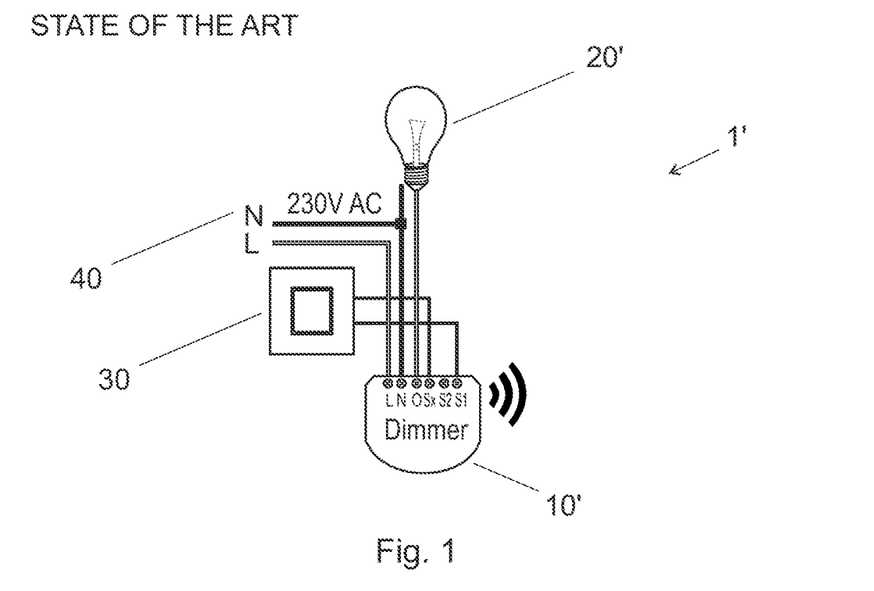
FIG. 1 illustrates schematically a known system for varying the luminous intensity of an incandescent lamp.

FIG. 1 illustrates schematically a known system 1' for varying the luminous intensity of an incandescent or filament lamp 20' (filament bulb). The illustrated system 1' comprises the incandescent lamp 20', which is coupled to a dimmer 10' and to a switch 30.

A dimmer is a device comprising a microprocessor-based or similar electronic device for varying the light intensity of the lamp 20'. In this context, a dimmer is therefore a digital dimmer.

The lamp 20' receives an alternating current AC from the electric grid 40, arranged for providing electrical power to appliances, equipment, and lighting typically found in homes and offices. The delivered frequency and voltage may vary from one country to another, but in general, large regions use common standard. For example, in Europe, the delivered frequency is 50 Hz and the delivered residential voltage is 230 V; in the USA, the delivered frequency is 60 Hz and the delivered residential voltage 120 V, etc. The value of 230V AC indicated in FIG. 1 is therefore not limitative. The same apply to other figures showing this value.

The old incandescent lamps 20' for domestic use represents a passive load of the resistive type in an alternating electrical circuit. Therefore, they are an ideal type of load, because the phenomena of parasitic capacity and inductance are null or negligible. A drawback of old incandescent lamps 20' is the very low performance between the absorbed energy and the useful lighting produced.

Old filament lamps 20', from an electrical point of view, are therefore passive elements that are limited to transform the electrical energy provided by the dimmer 10' into light. The principle is basic: varying the electrical energy provided by the dimmer 10', the luminosity of the lamp 20' varies.

Therefore, the variation of the luminous intensity of the old incandescent lamps 20' occurs substantially by using a technology well established, as developed and used for some decades. The dimmer 10' of FIG. 1 has a relatively simple technology and low cost and it is widely used today. The dimmer 10' can easily be installed in a (not illustrated) junction box or behind the switch 30.

The current electronic light sources that nowadays replace the old filament lamps 20' of FIG. 1 are much more than a simple passive charge. The vast majority comprise on-board electronics, using LED technology as a light-generating element, wherein the light-generating element and the on-board electronics are generally managed by a microcontroller.

In this context, an electronic light source (or electronic lamp) indicate a light-generating element plus an electronic system or circuit, e.g. an embedded electronic system or circuit. In this context, the electronic light source is an active load in an alternating current circuit. The electronic system of an electronic light source is arranged for supplying light-generating element with the necessary electrical energy for obtaining the desired brightness. The electronic system of an electronic light source is also arranged to measure the width of a pulse contained in the supply line.

In one preferred embodiment, the light-generating element of an electronic light source is a light-emitting diode (LED). In this preferred embodiment, the electronic light source comprises also an electronic circuit and a microcontroller, the microcontroller managing both the LED and the electronic circuit. In this context, an electronic light source is dimmable, i.e. it is possible to vary the luminosity or brightness of the light-generating element, i.e. by decreasing it or increasing it.

Figure 2:
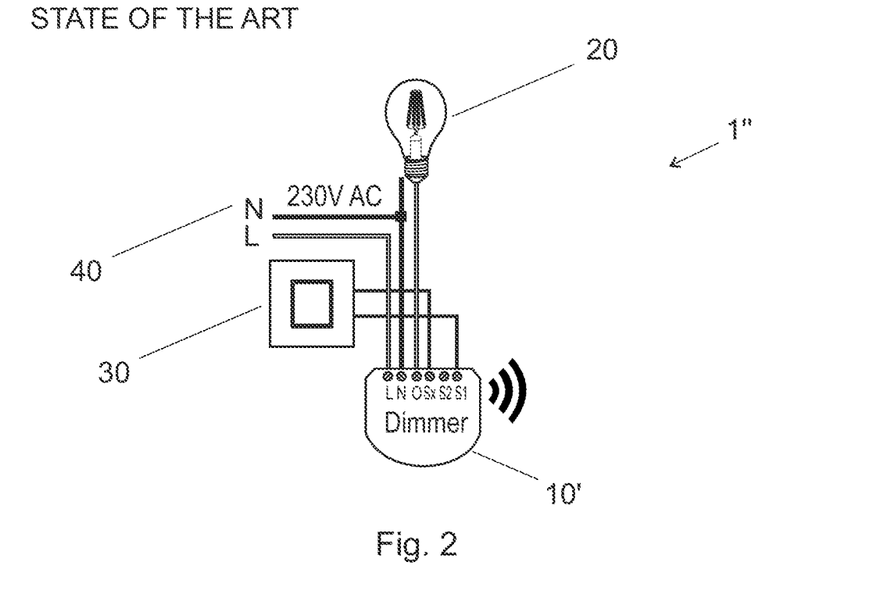
FIG. 2 illustrates schematically a known system for varying the luminous intensity of an electronic light source

Nowadays, electronic light sources replace the old filament lamps 20' of FIG. 1. FIG. 2 illustrates schematically a known system 1" for varying the luminous intensity of an electronic light source 20. As in FIG. 1, the electronic light source 20 is coupled to a dimmer 10' and to a switch 30, and receives an alternating current AC from the electric grid 40.

The electronic light sources 20 offer numerous advantages so that the old filament lamps 20' can be replaced directly without changing the electrical installation or adding equipment or adapters. For example, the dimmer 10' of the system 1' illustrated in FIG. 1 is the same dimmer 10' of the system 1" illustrated in FIG. 2.

The alternating current (AC) indicates an energy made available in the form of a potential difference or electrical voltage. This alternating electrical voltage is constant over time (the current may not be) and each passage through zero defines the beginning of a half cycle, serving as a reference for the timing of dimmers 10' (synchronization).

The dimmer 10' is arranged for producing ON/OFF states in each half cycle of the alternating current from the electric grid 40 and for modulating the width, i.e. the (temporal) duration, of the ON/OFF states. The half cycle is the length of time between each zero crossing of the alternating current. For example, for a frequency of 50 Hz, a half cycle has a duration of 10 ms.

In this context, the expression "ON state" indicates a positive (or negative) portion of the alternating current as modulated by a dimmer 10' and the expression "OFF state" indicates a null portion of the alternating current as modulated by a dimmer 10'.

The electronic light source 20 is arranged so as to interpret those ON/OFF states. In this way, the necessary energy is supplied to the light-generating element of the electronic light source 20, so that it produces the lighting as defined by the relation of the duration of the ON/OFF states. In other words, by modulating the width of the ON/OFF states, the dimmer 10' varies the amount of energy supplied to the light-generating element of the electronic light source 20 and thus its brightness.

In general, the dimmer 10' comprises an operation interface module, arranged for receiving a user command, and a control and processing module, arranged for modulating each half cycle of the alternating current on the basis of the user command.

Figure 3:
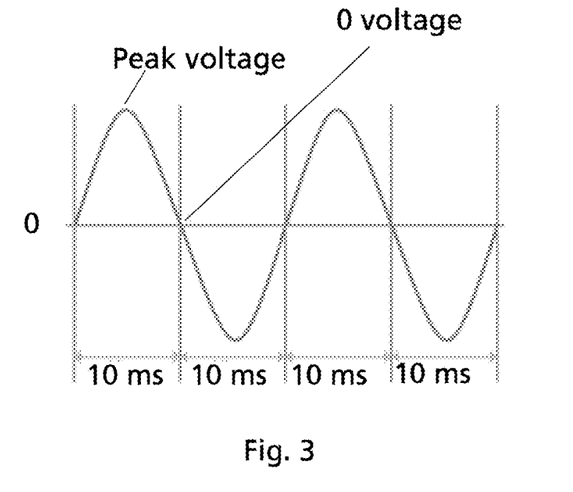
FIG. 3 illustrates an example of an alternating current waveform, having a frequency of 100 Hz.

FIG. 3 illustrates an example of an alternating current waveform, having a frequency of 100 Hz.

In the case of an alternating current of FIG. 3, the light-generating element of the electronic light source 20 turns on and off 100 times per second. It must be understood that in this context, the expression "turn on" means making the light-generating element lights up. It does not refer to a logical state of the dimmer dimming cycle. The same applies to the expression "turn off", mutatis mutandis. The turning on and off of the light-generating element in each half cycle of the alternating current is not detected by the human eye and the resentful luminosity of the light-generating element is related to the relationship between the ON/OFF states of the modulation performed by the operation interface module of the dimmer 10'.

In general, a dimmer 10' receives at its input an alternating current from the electric grid 40 and its operation interface module performs a modulation on this AC current so as to produce at the output of the dimmer 10' a variable or modulated alternating current, i.e. an AC current wherein the relation of the duration of the ON/OFF states in each half cycle of the modulated alternating current is variable.

The modulation performed by the operation interface module of the dimmer 10' can be a Pulse Width Modulation (PWM), synchronized by zero voltage crossing of the alternating current waveform, e.g. the alternating current waveform of FIG. 3.

A dimmer with an operation interface module performing a PWM modulation (or "PWM dimmer") receives at its input an alternating current from the electric network 40, transform it into a DC power source with one or more rectifiers and filters and produces at its output a modulated AC waveform. In other words, PWM dimmers produce a variable AC waveform at the output from a DC power source obtained from an AC current through rectification and filtering. The modulated AC waveform comprises in general only null or positive portions.

PWM dimmers are technically more advanced, more expensive, and rarely used in home lighting.

Other modulations different from the PWM can be performed by the operation interface module of the dimmer 10'. In such a case, in general, the dimmer receives at its input an AC current and produces at its outpour a modulated AC waveform without the intermediate conversion of the AC current to a DC power source, as in a PWM dimmer. The modulated AC waveform can comprise positive, null and negative portions.

Those not-PWM dimmers are of simpler design, and directly interrupts the AC power line of the electronic light source 20. Unlike PWM dimmers, the output is not a perfect sinusoid, but parts of the input wave, which still serve the purpose.

A (PWM or not-PWM) dimmer 10' is characterized by a "dimming value". The "dimming value" does not represent any physical quantity such as electric current or power. In this context, it is the percentage of time, for each half cycle of the alternating current, in which the dimmer is in the ON state in relation to the OFF state. In particular, the average time between the ON/OFF states in each half cycle is the "dimming value" and indicates the approximate value of the electrical power of the electronic light source 20. Indirectly, the "dimming value" roughly represents the brightness of the light-generating element of the electronic light source 20. With 0% "dimming value", the light-generating element is off and with 100%, it will be shining at maximum.

In other words, the "dimming value" is related to the luminous intensity, which in turn depends on the amount of electrical energy consumed. This electrical energy is the energy supplied by the dimmer that is defined by the ON/OFF states. By abstracting the performance of the electronic light sources (not relevant in this case), it is possible to assume that this value also represents approximately the electrical power in the electronic light source. Not being necessary in the context, it is also made abstraction of the correspondence between pulse width modulation value, electric power and luminous flux.

The dimming value of a dimmer 10' varies between 0% and 100%: 100% is the maximum value (that is the lamp at its maximum brightness or maximum power), and 0% the minimum value (lamp off). For example, for a frequency of 50 Hz, each half cycle (e.g. a pulse) has a maximum duration of 10 ms, so that a dimming value of 100% means a pulse "ON state" with a duration of 10 ms.

In the case of a PWM dimmer, for example, a dimming value of 20% means a pulse width modulation of 20%, in this case each pulse "ON state" has a duration of 2 ms.

Figure 4:
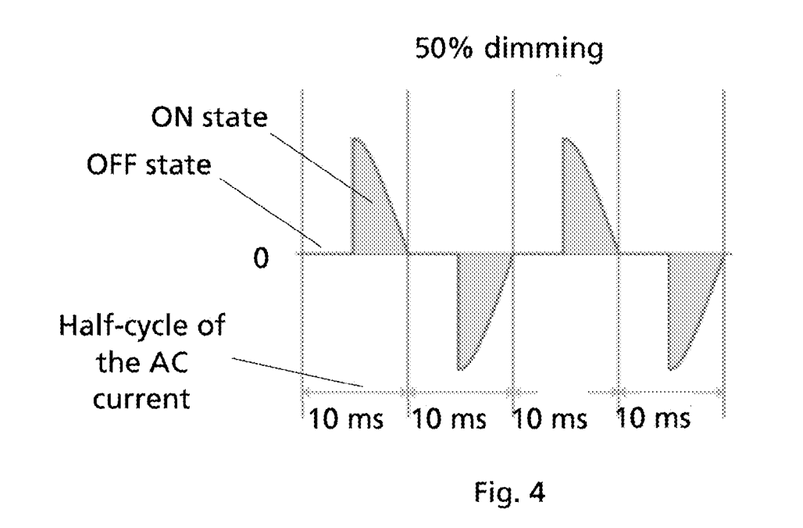
FIG. 4 shows an example of an alternating current waveform as modulated by a dimmer, for a dimming value of 50%.

FIG. 4 shows an example of an AC waveform as modulated by a dimmer, for a dimming value of 50%.

In operation, the embedded circuit of the electronic light source 20 measures the width of the pulse in the power line generated by the dimmer 10', and supplies the light-generating element of the electronic light source 20 itself, with the necessary electrical energy for the desired brightness. As with the filament lamp 20', this works correctly while the dimming values vary between 1% and 100%. If a user switches off the light-generating element or dim down to 0%, it will only come back on if the dimming value exceeds 25%.

Figure 5:
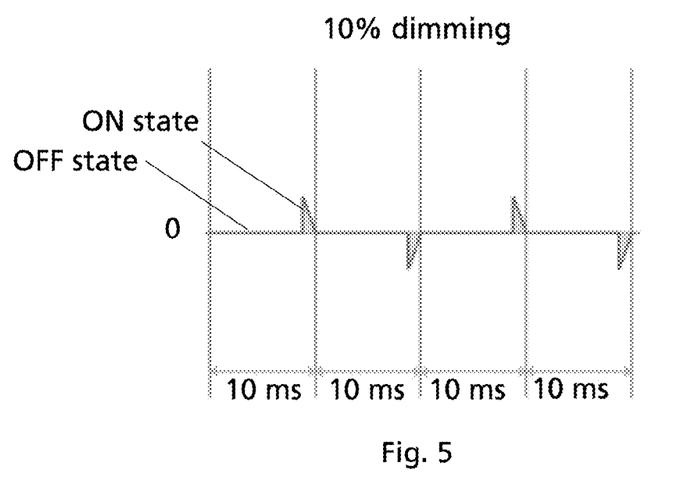
FIG. 5 illustrates a waveform at the dimmer output for 10% dimming.

FIG. 5 illustrates a waveform at the dimmer output for 10% of the dimming value. In this case, if the light-generating element is off and the user wishes to light it at 10%, it will not light at all. This is due to the fact that the energy supplied by the dimmer 10' is insufficient for the startup of the electronic circuit of the electronic light source 20. It has been experimentally demonstrated that the minimum energy required to start the electronic light source 20 represents about 25% of the dimming value. This can be seen as an initial inertia, and once exceeded, the electronic light source 20 works correctly with the dimmer 10', until the electronic light source 20 is turned off again.

In other words, with dimming values below 25%, the electronic light source 20 will be out of power for about 75% of the time, and from the OFF state, the embedded electronic circuit cannot start with those dimming values. In fact, from the situation wherein the light-emitting element is off, the light-emitting element will only light up with a dimming value greater than about 25%. Once the light-emitting element is on, the dimming value can be varied between 1% and 100%. If the dimming value is varied down to 0%, the light-emitting element goes out and the only way to turn it on again is to start over with a dimming value greater than 25%. This behaviour is a drawback of the system illustrated in FIG. 2, comprising a traditional dimmer 10' and an electronic light source 20.

Manufacturers of dimmers, aware of this problem, advise setting the minimum dimming value to 25%. By changing the value of this parameter, an offset is created in the dimming range, thus virtually resetting the minimum dimming to 0%, which actually represents 25% of the electronic light source's brightness. This solution masks the problem and on the other hand removes 25% of the useful dimming range.

Another possibility to overcome this problem is to switch to low voltage electronic light sources with the appropriate drivers. The problem is that this solution is more expensive, the drivers are generally larger than the current dimmers 10' and implies changes to an existing electrical installation with the resulting costs. Basically, it is no longer a simple lamp replacement, as from FIG. 1 to FIG. 2.

BRIEF SUMMARY

An aim of the present invention is the provision of a digital dimmer that overcomes the shortcomings and limitations of the state of the art.

Another aim of the invention is the provision of a digital dimmer that allows a user to turn on the electronic light source at a dimming value lower than 25%, e.g. starting from a turned off light-generating element.

Another aim of the invention is the provision of a digital dimmer which is simple and low cost.

Another aim of the invention is the provision of a digital dimmer which can be obtained from a known dimmer with a minimum number of modifications.

Another aim of the invention is the provision of a digital dimmer which exploits all the available dimming range.

According to the invention, these aims are attained by the object of the attached claims, and especially by the digital dimmer for varying the luminous intensity of an electronic light source of the claims and by the method for varying the luminous intensity of an electronic light source of the claims, whereas dependent claims deal with alternative and preferred embodiments of the invention.

The digital dimmer for varying the luminous intensity of an electronic light source according to the invention comprises:
  an operation interface module, arranged for receiving a user command,
  a control and processing module, arranged for modulating each half cycle of the alternating current on the basis of this user command.

According to the invention, if the user command is to turn on the electronic light source, in particular the light-generating element of the electronic light source, at a dimming value lower than 25%, the control and processing module is arranged in a first step for modulating the alternating current at a first dimming value equal or higher than 30% in a given number of half cycles of the alternating current: according to the invention, the duration of the given number of half cycles is not perceptible by the user's eye.

According to the invention, in a second step after the first step, the control and processing module is arranged for modulating the alternating current at a second dimming value lower than 25%, so as to ensure that the user sees only that the electronic light source lights up at the second dimming value.

The digital dimmer according to the invention can have the same hardware of the dimmers 10' of FIGS. 1 and 2 but the control and processing module is differently arranged so as to modify, through software, the behaviour of the dimmer 10' in order to boost the energy supplied to the electronic light source in a time interval imperceptible to human eyes.

The behaviour of the dimmer according to the invention is characterized mainly by two parameters: the number of half cycles of the alternating current wherein the alternating current is modulated at a first dimming value in the first step, and the dimming value during this number of half cycles.

Concerning the first parameter, the duration of the given number of half cycles is not be perceptible by the user's eye. The principle remains and is valid for any frequency of the electric grid. If this frequency is equal to 50 Hz as in Europe, it has been experimentally demonstrated by the applicant that a value of 10 cycles is suitable for most electronic light sources tested for a frequency of 50 Hz: therefore, in this case the duration of the given number of half cycle is equal or lower than 100 ms.

If this frequency is equal to 60 Hz as in the USA, in order to transfer the same amount of energy in the same time and as the duration of the half cycles is shorter, the value of the first parameter is increased by 1,2 (=60/50). Therefore, if the frequency is 60 Hz, the ideal value for this first parameter is 12 cycles.

Concerning the second parameter, i.e. the dimming value during this number of half cycles, it has been experimentally demonstrated by the applicant that a value equal or higher than 30%, and in particular a value equal or higher than 50%, is needed for boosting the energy supplied to the electronic light source, before lowering the dimming value at less than 25%.

Thanks to the digital dimmer according to the invention, a user can turn on the electronic light source at a dimming value lower than 25%, starting from a turned off light-generating element. Advantageously, the duration of the given number of half cycles wherein the energy supplied by the dimmer is sufficient for the startup of the electronic circuit of the electronic light source, is not perceptible by the user's eye: therefore, a user does not notice that during this period, the alternating current is modulated at a first dimming value equal or higher than 30%.

Another advantage of the digital dimmer according to the invention is that it is a very simple solution, which allows replacing the old filament lamps with new electronic light sources and continuing to use traditional dimmers by configuring differently the working of the control and processing module, without the drawbacks mentioned above.

In other words, known dimmers can be adapted to new electronic light sources, without the need to change the hardware architecture, e.g. via a firmware update or similar means.

The digital dimmer according to the invention can be also a new dimmer, not yet available in the market.

In one embodiment, the digital dimmer comprises a zero-crossing detection module, arranged for detecting each passage of zero volts of the alternating current, and for sending this information to the control and processing module; and the control and processing module is arranged for modulating each half cycle of the alternating current on the basis of said information.

The present invention concerns also a method method for varying the luminous intensity of an electronic light source by using a digital dimmer, the method comprising the steps of:
  receiving a user command by an operation interface module of the digital dimmer,
  modulating by a control and processing module each half cycle of the alternating current on the basis of said user command by a control and processing module, characterized in that
  if the user command is to turn on the electronic light source at a dimming value lower than 25%, the method comprises the steps of:
    A. modulating by the control and processing module the alternating current at a first dimming value equal or higher than 30% in a given number of half cycles of the alternating current, wherein the duration of said given number of half cycles is not perceptible by the user's eye,
    B. after the step A. modulating by the control and processing module the alternating current at a second dimming value lower than 25%, so as to ensure that the user sees only that the electronic light source lights up at the second dimming value.

In one preferred embodiment, the first dimming value is equal or higher than 50%.

In one preferred embodiment, the duration of said given number of half cycle is equal or lower than 100 ms.

In one preferred embodiment, the method comprises the steps of:

detecting by a zero-crossing detection module each passage of a reference value of the alternating current,
   sending this information by the zero-crossing detection module to the control and processing module of the digital dimmer.

BRIEF DESCRIPTION OF THE DRAWINGS

Exemplar embodiments of the invention are disclosed in the description and illustrated by the drawings in which.

DETAILED DESCRIPTION

Figure 6:
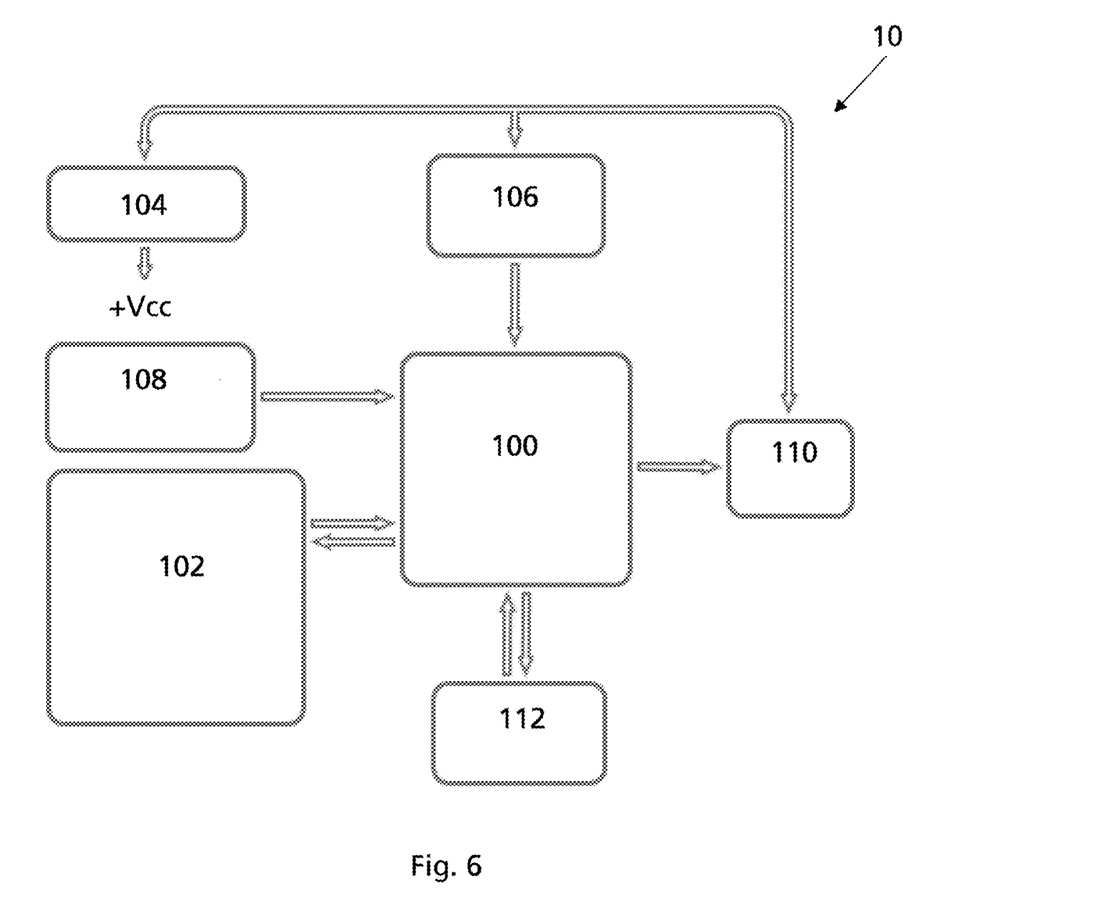
FIG. 6 illustrates a block diagram of one embodiment of the digital dimmer according to the invention.

FIG. 6 illustrates the block diagram of one embodiment of the digital dimmer 10 according to the invention. In this embodiment, the digital dimmer 10 has the same hardware components of the dimmer 10' of FIGS. 1 and 2. However, some components have been arranged so that their behaviour is different. In particular, the control and processing module 100 has been arranged differently from known solution, in particular via a software modification or a firmware modification.

In another embodiment (not illustrated), the digital dimmer 10 according to the invention comprises some hardware components the dimmer 10' of FIGS. 1 and 2 (in particular the operation interface module and the control and processing module) and also other hardware components which are different from those of the dimmer 10' of FIGS. 1 and 2.

The digital dimmer 10 is arranged so as to vary the luminous intensity of an electronic light source (not illustrated) by modulating each half cycle of the alternating current by ON/OFF or OFF/ON states.

Figure 7:
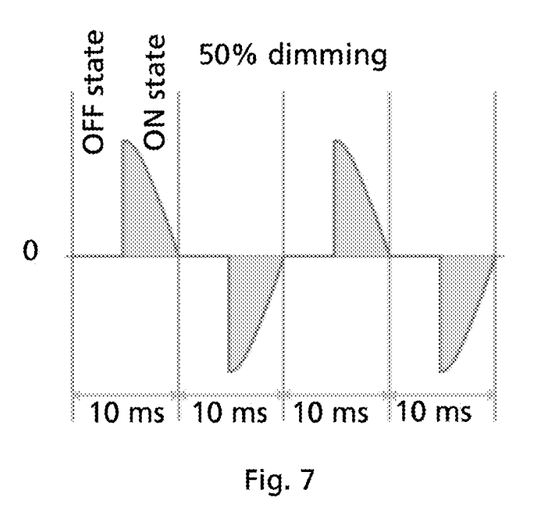
FIG. 7 shows an example of an alternating current waveform as modulated by a leading edge dimmer, for a dimming value of 50%.
Figure 8:
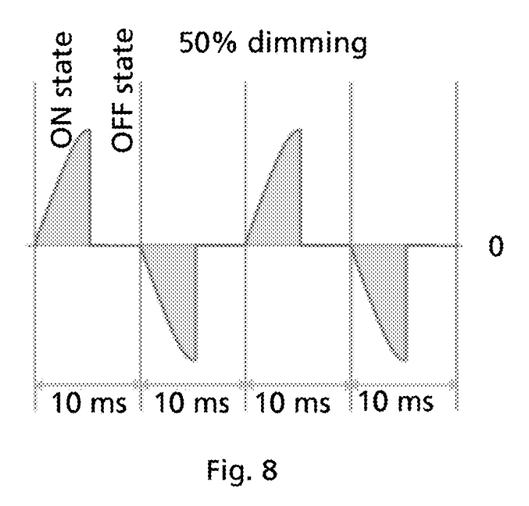
FIG. 8 shows an example of an alternating current waveform as modulated by a trailing edge dimmer, for a dimming value of 50%.

In each half cycle there will be an OFF state and an ON state. At the beginning of each half cycle, if the OFF state is initiated before the ON state, as illustrated in FIG. 7, the dimmer is named "leading edge" dimmer. Conversely, if the ON state is initiated first, as illustrated in FIG. 8, it is named "trailing edge" dimmer.

In this context, the term "edge" indicates the cut part of the wave, which in turn represents the OFF state. In this situation, the edge is located after passing through zero.

Generally, digital dimmers allow them to be configured to work in either mode or another, thus allowing a better adaptation to the type of load. The dimmer according to the invention is perfectly suited to these two types of operation.

The digital dimmer 10 according to the invention comprises:

an operation interface module 102, arranged for receiving a user command,
   a control and processing module 100, arranged for modulating each half cycle of the alternating current on the basis of said user command.

According to the invention, if the user command is to turn on the electronic light source at a dimming value lower than 25%, the control and processing module is arranged in a first step for modulating the alternating current at a first dimming value equal or higher than 30% in a given number of half cycles of the alternating current, wherein the duration of this given number of half cycles is not perceptible by the user's eye.

According to the invention, in a second step after the first step, the control and processing module 100 is arranged for modulating the alternating current at a second dimming value lower than 25%, so as to ensure that the user sees only that the electronic light source lights up at the second dimming value.

In one preferred embodiment, the behavior of the dimmer according to the invention is based on an algorithm that can be implemented in a known dimmer 10', without requiring hardware changes, via a firmware update or similar means.

The purpose of this algorithm is to compel the known dimmer to supply the minimum energy for starting an electronic light source (not illustrated) connected to the dimmer, when it is off.

In one preferred embodiment, the C-language pseudocode of the software is:

```
void go_Smart_Start_Dimming(int startCycles, int startDimming,
int newDimming)
{
  int i;
  for (i = 0; i < startCycles; i++)
  {
    while(newHalfCycle) {}
    // Wait for new AC zero crossing
    actualDimming = startDimming;
  }
  actualDimming = newDimming;
}
```

The above pseudocode is for illustration only and does not limit the idea by either the programming language used or its structure.

Starting from a dimming value of 0% (status off), if a higher value of dimming is requested, the function 'go_Smart_Start_Dimming' is executed. The parameter 'newDimming' represents the new desired dimming value.

The underlying idea is to modulate a pulse of sufficient width in a given number of half cycles of the AC current to ensure that the electronic light source starts. This process represents the initial energy required to overcome the starting inertia and once executed then proceeds to the desired dimming value.

The best experimentally values determined by the applicant are 10 for the number of half cycles (startCycles) and 50% for the initial dimming value (startDimming). In general, initial dimming values equal or higher than 30% allow to boost the electronic circuit of the electronic light source.

Although these values have been shown to work properly on different models, they can be modified as parameters or other means to work with any type of electronic light sources or dimmers. In this way the 'Smart Start Dimming' process is universal in terms of the type of electronic lamps and dimmers.

With the above-mentioned values, the process has a duration of 100 ms for a frequency of 50 Hz and goes completely unnoticed to the human eye. Therefore, it is possible to go from a dimming value of 0% to for example 10% without any problem because it is guaranteed that the light-generating element of the electronic light source will light up.

Figure 9:
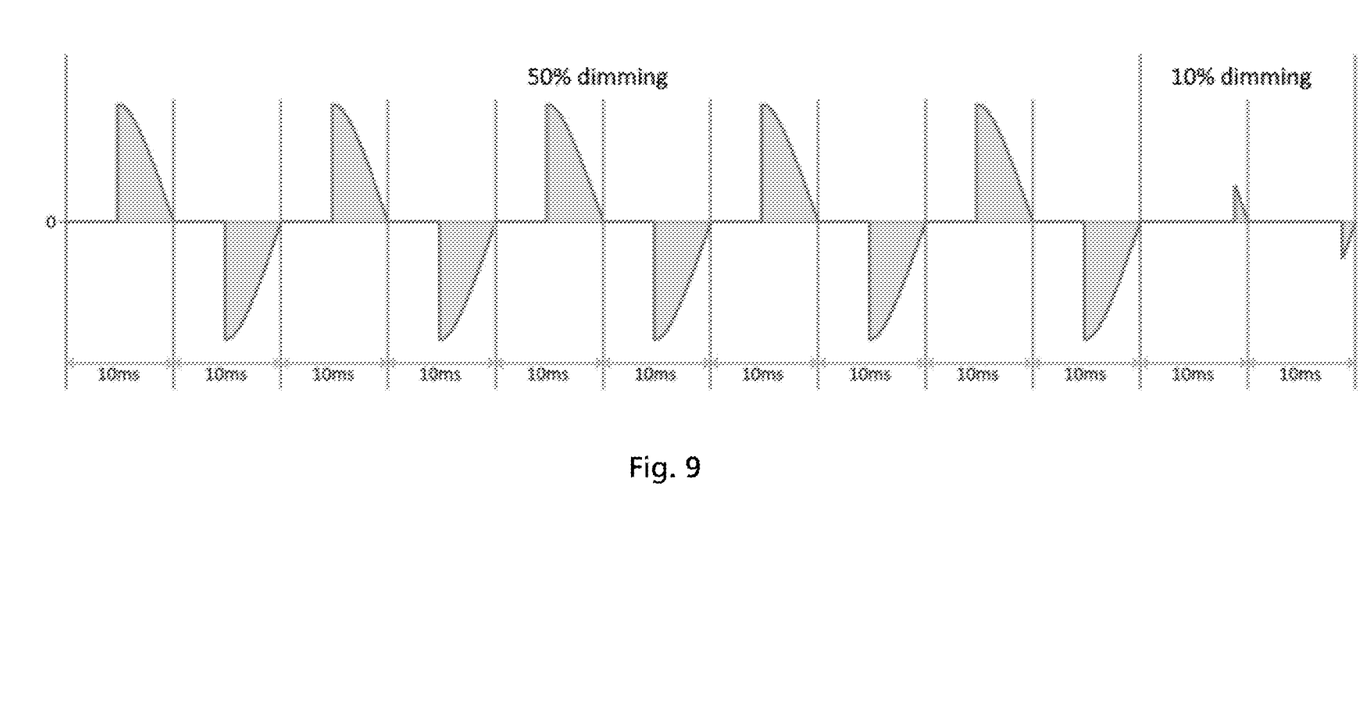
FIG. 9 shows an example of an alternating current waveform at the output of the dimmer according to the invention.

FIG. 9 shows an example of an alternating current waveform at the output of the dimmer according to the invention, by applying the described principle and mentioned best values: 10 half cycles at 50% to ensure startup, followed by the requested dimming value at 10%. The 10 half cycles at 50% are completely unnoticed to the user's eyes so that the user sees only that the light-generating element lights up at a dimming value of 10%.

The algorithm here above can be implemented or added to the software currently running on the dimmer 10, in particular in the control and processing module 100.

The control and processing module 100 is therefore the heart of the dimmer 10. In general, it is based on a microcontroller and some external components.

It is responsible for lighting the light-generating element as defined by the user, according to the configuration parameters.

In the example of FIG. 6, the control and processing module 100 has a bi-directional communication with the operation interface module 102.

In one embodiment, the operation interface module 102 directly depends on the protocol used by the dimmer 10. For example: if it is a DMX512 dimmer, this operation interface module 102 will be based on the EIA-485 standard (RS485 port). If it is a Z-Wave dimmer, this operation interface module 102 will pass through an RF transponder. The operation interface module 102 can be based in alternative on KNX, Dali, Zigbee, etc. Through a gateway or API, the operation interface module 102 access to the dimmer 10 with a third-party app. With this app, the user can turn the light-generating element on or off, dim it, receive the status as well as consumption. In some embodiments, the operation interface module 102 allows also a reconfiguration of some parameters of the dimmer 10, as well as a firmware update.

In the embodiment of FIG. 6, the dimmer 10 comprises also a power supply module 104: its function is to feed the embedded electronics that are part of the dimmer 10. It is connected to the (not illustrated) alternating current waveform from the electric grid 40.

In the embodiment of FIG. 6, the dimmer 10 comprises also a zero-crossing detection module 106, connected as well to the (not illustrated) alternating current waveform from the electric grid 40. This module is arranged for detecting each passage of zero volts of alternating current waveform from the electric grid 40. This information is sent to the control and processing module 100.

In the embodiment of FIG. 6, the dimmer 10 comprises also a user interface module 108, comprising haptic means as e.g. keyboard so that the user can interact with the dimmer 10. In some cases, the haptic means can be placed away from the dimmer 10 and connected to it via a (wireless or wired) communication bus.

In the embodiment of FIG. 6, the dimmer 10 comprises also an output stage module 110: it is the interface between the control and processing module and the electric current to be applied to the active load, i.e. to the light electronic source 20 (not illustrated). It can comprise Triac or Mosfet transistors, as well as a (snubber) filter.

In the embodiment of FIG. 6, the dimmer 10 comprises also a service interface module 112, e.g. an RS232 port, whose function is the setup of the parameters defined by the manufacturer and/or firmware updates.

Figure 10:
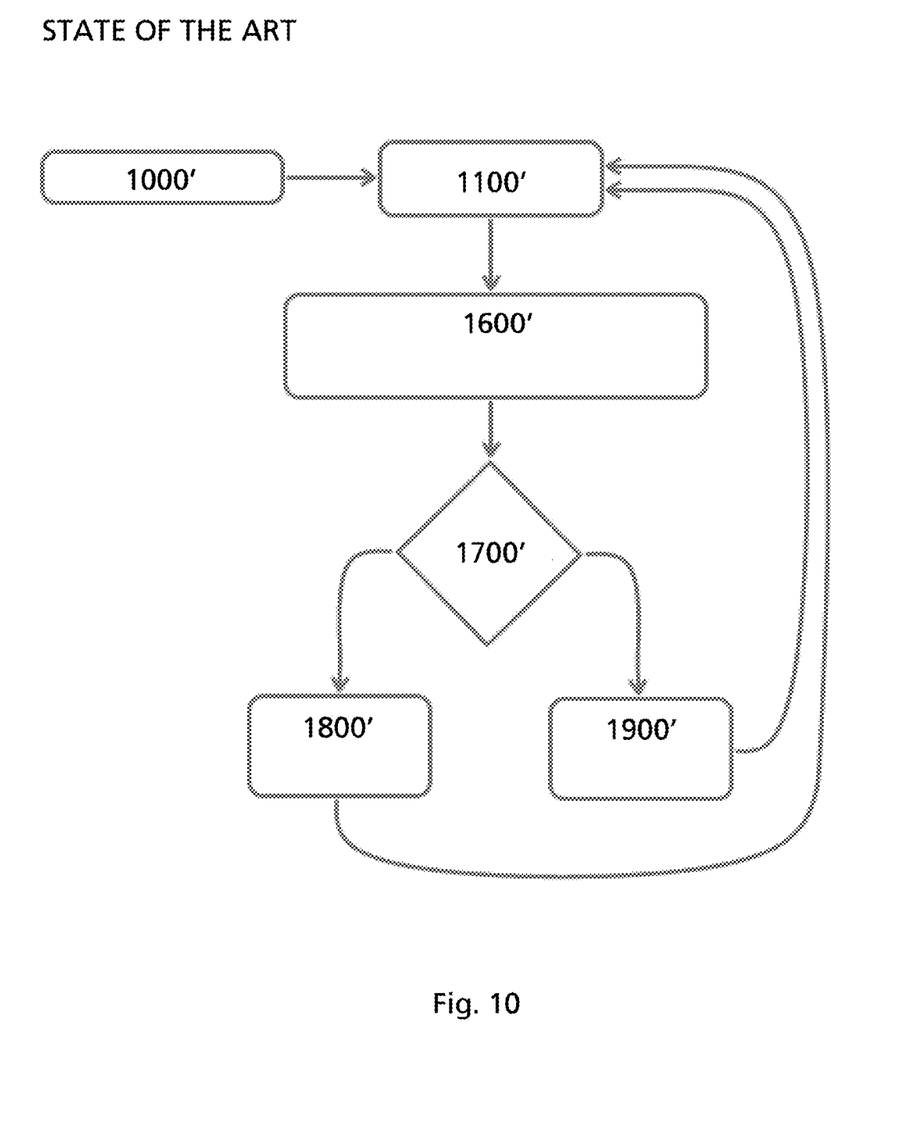
FIG. 10 shows an example of the flow diagram of the dimming cycle in a known dimmer 10'.

FIG. 10 illustrates an example of the flow diagram of the dimming cycle in a known dimmer 10', for both a leading edge dimmer and a trailing edge dimmer and a frequency of 50 Hz. For a given dimming value (from 0% to 100%, step 1000'), the dimmer 10' waits for the next zero crossing of the alternating current waveform, e.g. the alternating current waveform of FIG. 3 (step 1100'). For a frequency of 50 Hz, the time of a half cycle (tCycle) of the alternating current waveform is 10 ms: in this half cycle, the time of the state ON (timeON) and of the state OFF (timeOFF) is defined depending on the dimming value of step 1000' (step 1600'), e.g. according to the following algorithm:

tCycle=10 ms
timeON=tCycle/(100/dimmingValue)
timeOFF=tCycle−tON

Then, it is checked if the dimmer is a leading edge dimmer or a trailing edge dimmer at step 1700'.

If the dimmer is a leading edge dimmer, then at step 1800' the OFF state is initiated before the ON state, as illustrated e.g. in FIG. 7, e.g. with the following algorithm:

State=OFF
Wait timeOFF
State=ON

If the dimmer is a trailing edge dimmer, then at step 1900' the ON state is initiated before the OFF state, as illustrated e.g. in FIG. 8, e.g. with the following algorithm:

State=ON
Wait timeON
State=OFF

Then, the dimming cycle comes back to the step 1100'.

Figure 11:
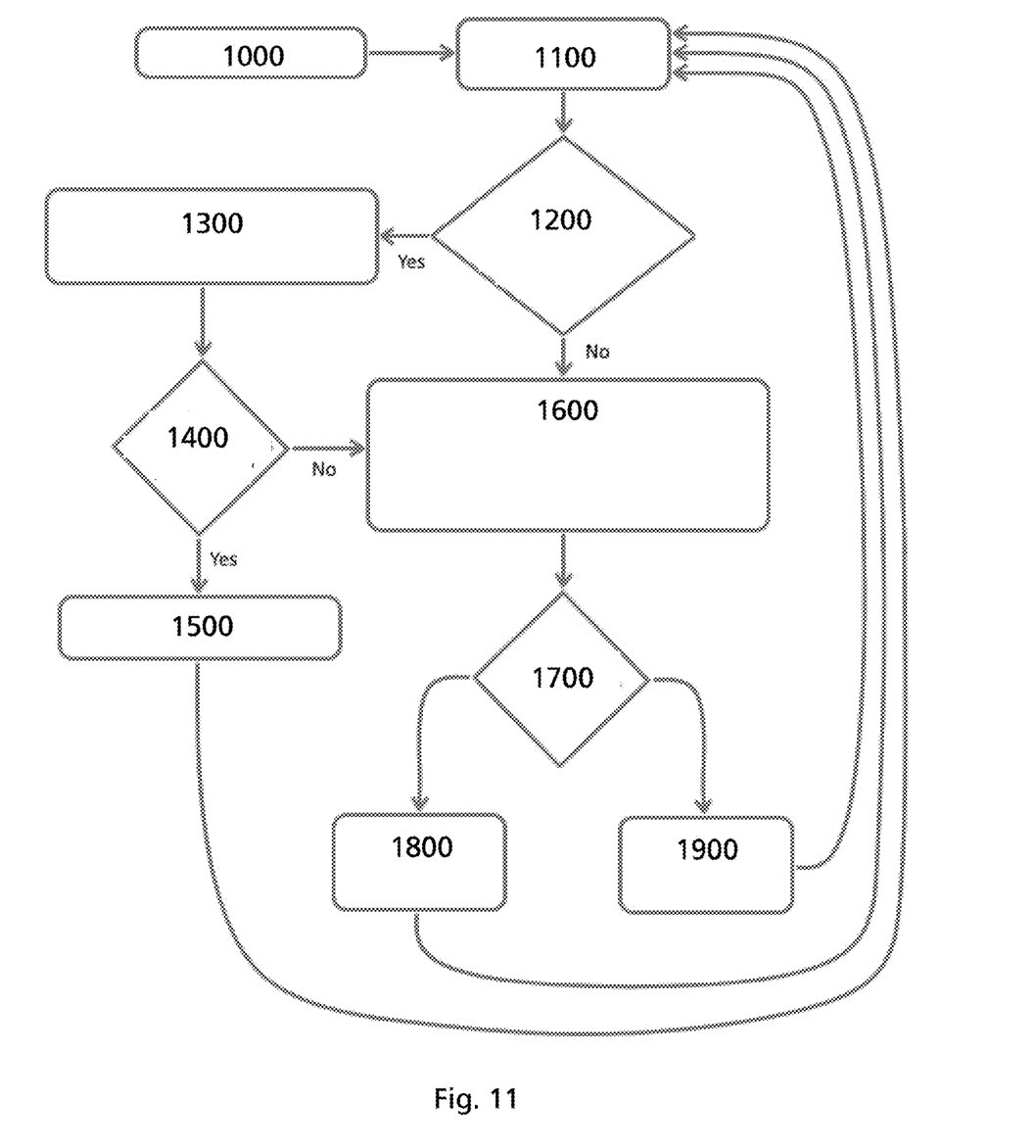
FIG. 11 shows an example of the flow diagram of the dimming cycle of the dimmer 10 according to the invention.

FIG. 11 illustrates an example of the flow diagram of the dimming cycle of the dimmer 10 according to the invention. Steps 1000 and 1100 are as steps 1000' and 1100' in FIG. 10. After step 1100 there is a new step 1200, in which it is checked if the dimming value is higher than 0% and if the procedure smartStart of step 1300 is needed. This is the case for example if the user command is to turn on the electronic light source at a dimming value lower than 25%.

If the dimming value is higher than 0% and if the procedure smartStart of step 1300 is needed, then the procedure smartStart is executed at step 1300, e.g. with the following algorithm:

holdvalue=dimmingValue
dimmingvalue=smartStartPower
run loop smartStartCycles

This allows to modulate the alternating current at a first dimming value (smartStartPower) equal or higher than 30% in a given number of half cycles (smartStartCycles) of the alternating current, wherein the duration of said given number of half cycles is not perceptible by the user's eye.

If at step 1200 the dimming value is not higher than 0% and/or if the procedure smartStart of step 1300 is not needed, then the dimming cycle goes to step 1600, similar to step 1600' of FIG. 10, wherein in time of a half cycle (tCycle) of the alternating current waveform, the time of the state ON (timeON) and of the state OFF (timeOFF) is defined depending on the dimming value of step 1000, e.g. according to the following algorithm:

tCycle=10 ms
    timeON=tCycle/(100/dimmingValue)
    timeOFF=tCycle-tON
    if DimmingValue=0 then
        smartStartNeeded=true The step 1600 is followed by steps 1700, 1800 and 1900, which correspond to steps 1700', 1800' respectively 1900' of FIG. 10. The dimming cycle then comes back to step 1100.

The step 1300 is followed by the step 1400 of checking if the given number of half cycle (smartStartCycles) has been performed.

Then, at step 1500 the alternating current is modulated at a dimming value set by the user (dimmingValue) so as to ensure that the user sees only that the electronic light source lights up at this dimming value, e.g. according to the following algorithm:

DimmingValue=holdValue
    smartStartNeeded=false The dimming cycle then comes back to step 1100.

REFERENCE NUMBERS USED IN THE DRAWINGS

1' Known system for varying the luminous intensity of an incandescent lamp
1" Known system for varying the luminous intensity of an electronic light source
10 Dimmer
10' Known dimmer
20 Electronic light source (active load)
20' Filament lamp (passive load)
30 Switch
40 Electric grid
100 Control and processing module
102 Operation interface module
104 Power supply module
106 Zero-crossing detection module
108 User interface module
110 Output stage module
112 Service interface module
1000, 1000' Step of setting the dimming value
1100, 1100' Step of waiting zero crossing of the alternating current
1200 Step of checking if the dimming value is higher than 0% and if the procedure smartStart is needed
1300 Step of the procedure smartStart
1400 Step of checking if the given number of half cycle has been performed
1500 Step of modulating the alternating current at a dimming value set by the user
1600, 1600' Step of defining the time of the state ON and of the state OFF
1700, 1700' Step of checking if the dimmer is a leading edge or a trailing edge dimmer
1800, 1800' Step of initiating the OFF state before the ON state
1900, 1900' Step of initiating the ON state before the OFF state

What is claimed is:

1. A digital dimmer for varying the luminous intensity of an electronic light source, comprising a LED and an electronic circuit configured to supply an alternating current to the LED, said digital dimmer comprising:

an operation interface module, arranged for receiving a user command,
a control and processing module, arranged for modulating each half cycle of the alternating current on the basis of said user command,
characterized in that
when the user command is to turn on the electronic light source at a dimming value lower than 25%, the control and processing module is arranged in a first step for modulating the alternating current at a first dimming value equal or higher than 30% in a given number of half cycles of the alternating current, wherein the duration of said given number of half cycles is equal or lower than 100 ms so that it is not perceptible by the user's eye, and
in a second step after the first step, the control and processing module is arranged for modulating the alternating current at a second dimming value lower than 25%, so as to ensure that the user sees only that the electronic light source lights up at the second dimming value.

2. The digital dimmer of claim 1, wherein the first dimming value is equal or higher than 50%.

3. The digital dimmer of claim 1, wherein the digital dimmer comprises:
a zero-crossing detection module, arranged for detecting each passage of zero volts of the alternating current, and for sending this information to the control and processing module,
wherein
the control and processing module is arranged for modulating each half cycle of the alternating current on the basis of said information.

4. The digital dimmer of claim 3, wherein each half cycle comprises an OFF state and an ON state.

5. The digital dimmer of claim 4, wherein the OFF state is initiated before the ON state.

6. The digital dimmer of claim 4, wherein the ON state is initiated before the OFF state.

7. The digital dimmer of claim 1, wherein the modulation performed by the control and processing module is a PWM modulation, synchronized by zero voltage crossing of the alternating current waveform.

8. The digital dimmer of claim 1, wherein the operation interface module is arranged for allowing the access to the digital dimmer with a third party app, allowing the user to turn the electronic light source on or off, dim it, or receive the status, or consumption.

9. The digital dimmer of claim 8, wherein operation interface module is arranged for allowing a reconfiguration of some parameters of the digital dimmer and/or firmware update.

10. The digital dimmer of claim 1, comprising a service interface module arranged for executing a setup of parameters defined by the manufacturer and/or firmware updates.

11. A method for varying the luminous intensity of an electronic light source by using a digital dimmer, said electronic light source comprising a LED and an electronic circuit configured to supply an alternating current to the LED, the method comprising the steps of:

receiving a user command by an operation interface module of the digital dimmer,
modulating by a control and processing module each half cycle of the alternating current on the basis of said user command by the control and processing module,
characterized in that
when the user command is to turn on the electronic light source at a dimming value lower than 25%, the method comprises the steps of:

A. modulating by the control and processing module the alternating current at a first dimming value equal or higher than 30% in a given number of half cycles of the alternating current, wherein the duration of said given number of half cycles is equal or lower than 100 ms, so that it is not perceptible by the user's eye, B. after the step A. modulating by the control and processing module the alternating current at a second dimming value lower than 25%, so as to ensure that the user sees only that the electronic light source lights up at the second dimming value.

12. The method of claim 11, wherein the first dimming value is equal or higher than 50%.

13. The method of claim 11, further comprising the steps of:
detecting by a zero-crossing detection module each passage of a reference value of the alternating current,
sending this information by the zero-crossing detection module to the control and processing module of the digital dimmer.

14. The digital dimmer of claim 10, wherein the service interface module comprises an RS232 port.

15. The digital dimmer of claim 1, wherein for a first frequency of operation, the number of the half cycles is 10.

16. The digital dimmer of claim 1, wherein for a second frequency of operation, the number of half cycles is 12.

17. The digital dimmer of claim 4, wherein the time of the ON state and the OFF state is defined depending on the dimming value.

18. The digital dimmer of claim 1, wherein a check is made if the given number of half cycles has been performed.

19. The digital dimmer of claim 18, wherein the check is performed prior to modulating the alternating current at the second dimming value lower than 25%.

20. The digital dimmer of claim 1, wherein each half cycle has a maximum duration of 10 ms.

* * * * *